Patented Dec. 24, 1935

2,025,582

UNITED STATES PATENT OFFICE 2,025,582

WATER-INSOLUBLE AZO DYESTUFFS

Ernst Fischer, Frankfort-on-the-Main-Hochst, Germany, assignor to General Aniline Works, Inc., New York, N. Y., a corporation of Delaware No Drawing. Application September 20, 1933, Serial No. 690,291. In Germany September 24, 1932

4 Claims. (Cl. 260—95)

The present invention relates to water-insoluble azo-dyestuffs; more particularly it relates to compounds of the following general formula:

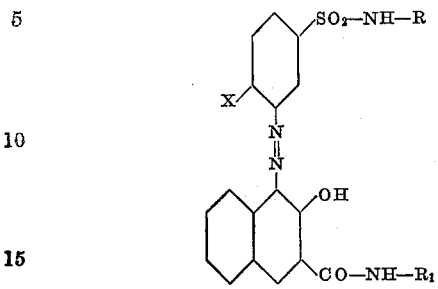

wherein X means an alkyl or alkoxy group, R stands for hydrogen, an alkyl, aryl, aralkyl or hydroaromatic radical and $R_1$ stands for a radical of the benzene or naphthalene series.

I have found that valuable red pigment dyestuffs are obtainable by coupling the diazo compounds of bases of the general formula:

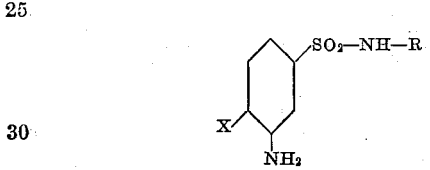

wherein X means an alkyl or alkoxy group and R stands for hydrogen, an alkyl, aryl, aralkyl or hydroaromatic radical, with arylides of 2,3-nydroxynaphthoic acid, only such components being used as do not contain groups lending solubility, such as the sulfonic acid or carboxylic acid group.

The dyestuffs may be used for the preparation of lakes which are fast to oils and very fast to light as well as for coloring masses which are capable of being formed, especially natural rubber or synthetic products having properties similar to those of natural rubber. By incorporating the dyestuffs with rubber products mixtures are obtained which are fast to vulcanization and very fast to light. These good properties are surprising because the diazo compounds of the bases which are comprised by the above formula are unsuitable for the preparation of dyeings on the fiber since a great part of the dyestuffs is removed from the fiber even by soaping at the boil.

The following examples serve to illustrate the invention, but they are not intended to limit it thereto, the parts being by weight:

(1) 10.1 parts of 3-amino-4-methoxybenzene-1-sulfamide are diazotized in the usual manner. In order to bind the excess of hydrochloric acid, sodium acetate is added to the diazo solution which, thereupon, is run into a solution of 14.65 parts of 2',3'-hydroxynaphthoyl-1-amino-2-methoxybenzene in dilute caustic soda solution. The dyestuff which has precipitated and corresponds to the following formula:

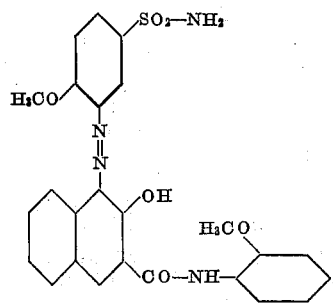

is filtered by suction, washed well and dried. It forms a red powder. Lakes which have been prepared in known manner from this dyestuff are fast to oils and yield red tints which are fast to light.

The coupling may also be effected in the presence of a substratum adapted for the production of lakes.

(2) 10 parts of 3-amino-4-methylbenzene-1-sulfonic acid-methylamide are diazotized as usual. The diazo solution is rendered neutral to Congo paper by means of sodium acetate and is introduced, while stirring, into a solution of 14.65 parts of 2',3'-hydroxynaphthoyl-1-amino-4-methoxybenzene in dilute caustic soda solution. The red dyestuff, thus formed, which corresponds to the following formula

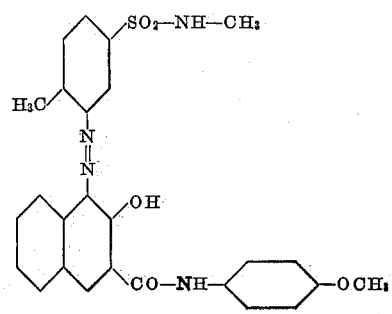

is filtered by suction, washed well and dried. It may be used in known manner for the preparation of lakes which are fast to oils and yield red tints of good fastness to light.

(3) By using in Example 2, instead of 2',3'-hydroxynaphthoyl-1-amino-4-methoxybenzene, 2',3'-hydroxynaphthoyl-1-amino-2-methoxybenzene, there are likewise obtained red lakes which have similarly good fastness properties and shades of a somewhat more yellowish hue than those of the lakes prepared according to Example 2.

(4) A pigment dye is prepared from 13.8 parts of 3-amino-4-methylbenzene-1-sulfonic acid-benzylamide and 14.65 parts of 2',3'-hydroxynaphthoyl-1-amino-2-methoxybenzene in the manner described in Examples 1 and 2, it yields red lakes which are fast to oils and to light.

(5) The pigment dyestuff which is prepared according to the statements in Example 1 from 14.2 parts of 3-amino-4-methoxybenzene-1-sulfonic acid-cyclohexylamide and 14.65 parts of 2',3'-hydroxynaphthoyl-1-amino-2-methoxybenzene forms a red powder from which red lakes of good fastness to oils and to light may be prepared in known manner.

(6) From 13.1 parts of 3-amino-4-methylbenzene-1-sulfanilide and 14.65 parts of 2',3'-hydroxynaphthoyl-1-amino-2-methoxybenzene there is obtained in the manner described in Examples 1 and 2 a red pigment dye which yields according to known methods red lakes which are fast to oils and to light.

(7) A pigment dye which is adapted for coloring rubber products is prepared according to the statements in Example 1 from 10.1 parts of 3-amino-4-methoxybenzene-1-sulfamide and 13.15 parts of 2',3'-hydroxynaphthoyl-aminobenzene. Thereupon, a rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide and 4 parts of the aforesaid dyestuff. The mixture is vulcanized in a vulcanization press for 12 minutes at a steam pressure of 3 atmospheres above atmospheric pressure. There is obtained a very pure, vivid red vulcanizate which is very fast to light, neither bleeds nor gives rise to that phenomenon which is known as blushing or efflorescence when the rubber articles are stored.

A mixture of crepe rubber, the usual admixtures and 4 parts of the aforesaid dyestuff is vulcanized in the cold by immersing it in a solution of sulfur chloride in benzine. The vulcanizate, thus obtained, has properties which are the same as those of the vulcanizate described above.

(8) By using in Example 7, instead of 10.1 parts of 3-amino-4-methoxybenzene-1-sulfamide, 10.8 parts of 3-amino-4-methoxybenzene-1-sulfonic acid-methylamide, a dyestuff is obtained which yields, when incorporated with a rubber product according to the manner described in Example 7, a red mixture which is fast to vulcanization and possesses a high fastness to light.

(9) The pigment dye from 10 parts of 3-amino-4-methylbenzene-1-sulfonic acid-methyl-amide and 13.15 parts of 2',3'-hydroxynaphthoyl-aminobenzene is incorporated with a rubber product in the manner indicated in Example 7. There is obtained a mixture which is likewise fast to vulcanization and to light and possesses a shade of a somewhat more yellowish hue than that of the product obtained according to Examples 7 and 8.

(10) A red pigment dye is obtained in the manner described in Examples 1 and 2 from 11.5 parts of 3-amino-4-ethoxybenzene-1-sulfonic acid-methylamide and 14.65 parts of 2',3'-hydroxynaphthoyl-1-amino-4-methoxybenzene. The lake prepared therefrom by known methods is fast to oils and yields red tints which are fast to light.

The following dyestuffs, among others, are capable of production in accordance with this invention:

| | Diazo compound of— | Combined with— | Shade |
|---|---|---|---|
| | 3-amino-4-methyl-benzene-1-sulfonic acid- | 2',3'-hydroxynaphthoyl- | |
| 1 | Amide | 1-amino-napthalene | Red. |
| 2 | Amide | 2-amino-naphthalene | Red. |
| 3 | Amide | 1-amino-3-methyl-benzene | Red. |
| 4 | Amide | 1-amino-2-methoxy-5-chloro-benzene. | Red. |
| 5 | Amide | 1-amino-2-methoxy-4-chloro-benzene. | Red. |
| 6 | Amide | 1-amino-2-ethoxy-benzene | Red. |
| 7 | Methylamide | 1-amino-4-chloro-benzene | Red. |
| 8 | Methylamide | 1-amino-2-methoxy-5-chloro-benzene. | Red. |
| 9 | Methylamide | 1-amino-2-methoxy-4-chloro-benzene. | Red. |
| 10 | Ethylamide | 1-amino-2-methoxy-benzene | Red. |
| 11 | Ethylamide | 1-amino-4-methoxy-benzene | Red. |
| 12 | Ethanolamide | 1-amino-2-methoxy-benzene | Red. |
| 13 | Ethanolamide | 1-amino-4-methoxy-benzene | Red. |
| 14 | n-butylamide | 1-amino-2-methoxy-benzene | Red. |
| 15 | n-butylamide | 1-amino-4-methoxy-benzene | Red. |
| 16 | n-butylamide | 1-amino-2,4-dimethoxy-5-chlorobenzene. | Red. |
| 17 | Anilide | 1-amino-4-methoxy-benzene | Red. |
| 18 | Anilide | 1-amino-2-methoxy-4-chloro-benzene. | Red. |
| 19 | Ortho-chloro-anilide | 1-amino-2-methoxy-benzene | Red. |
| 20 | Ortho-chloro-anilide | 1-amino-4-methoxy-benzene | Red. |
| 21 | Benzylamide | 1-amino-4-methoxy-benzene | Red. |
| 22 | Cyclohexylamide | Amino-benzene | Red. |
| 23 | Cyclohexylamide | 1-amino-2-methoxy-benzene | Red. |
| 24 | Cyclohexylamide | 1-amino-4-methoxy-benzene | Red. |
| | 3-amino-4-methoxy-benzene-1-sulfonic acid- | | |
| 25 | Methylamide | 1-amino-2-methoxy-benzene | Red. |
| 26 | Methylamide | 1-amino-4-methoxy-benzene | Red. |
| 27 | Ethylamide | Aminobenzene | Red. |
| 28 | Benzylamide | 1-amino-2-methoxy-benzene | Red. |
| 29 | Benzylamide | 1-amino-4-methoxy-benzene | Red. |
| 30 | Cyclohexylamide | Aminobenzene | Red. |
| 31 | Cyclohexylamide | 1-amino-4-methoxybenzene | Red. |

Since an object of the present invention is to produce dyestuffs of good fastness properties which dyestuffs are insoluble in water, it is to be understood that the aromatic nuclei of the general formulæ appearing in the appended claims do not contain any substituents which are known to render the dyestuffs soluble in water. Substituents of this kind are, for instance, the sulfonic acid and carboxylic acid group.

I claim:
1. The water-insoluble azo-dyestuffs of the following general formula:

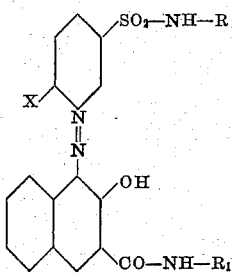

wherein X means an alkyl or alkoxy group, R stands for hydrogen, an alkyl, benzyl, a completely hydrogenated hydroaromatic radical or a radical of the benzene series and $R_1$ stands for a radical of the benzene or naphthalene series, yielding fast red lakes and, when mixed with rubber products, red dyeings of very good fastness to light and to vulcanization.

2. The water-insoluble azo-dyestuff of the following formula:

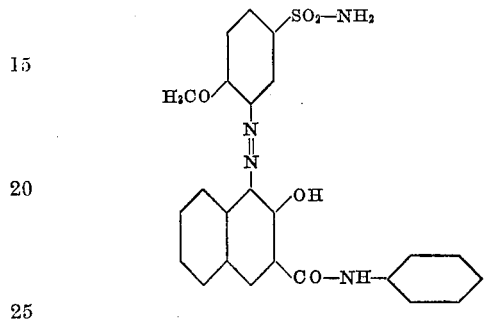

yielding, when mixed with rubber products, vivid red dyeings of a very good fastness to light and to vulcanization.

3. The water-insoluble azo-dyestuff of the following formula:

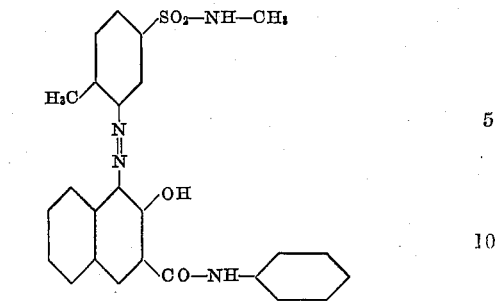

yielding, when mixed with rubber products, red dyeings with a yellow hue of a very good fastness to light and to vulcanization.

4. The water-insoluble azo-dyestuffs of the following formula:

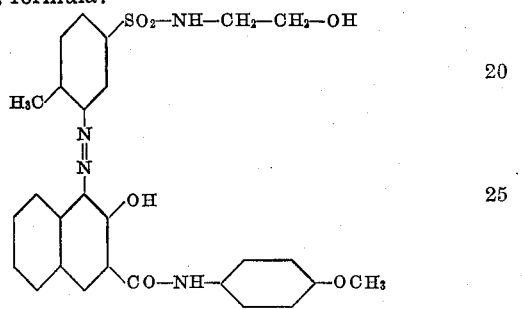

yielding red lakes of very good fastness to light and to oils.

ERNST FISCHER.